United States Patent

Bergstrom

[15] 3,650,004
[45] Mar. 21, 1972

[54] BEARING REPAIR

[72] Inventor: Theodore R. Bergstrom, Little Canada, Minn.

[73] Assignee: Minnesota Mining and Manufacturing Company

[22] Filed: Dec. 22, 1969

[21] Appl. No.: 887,431

Related U.S. Application Data

[63] Continuation-in-part of Ser. No. 678,431, Oct. 26, 1967, abandoned, and a continuation-in-part of Ser. No. 848,672, Aug. 8, 1969.

[52] U.S. Cl.............................29/149.5 B, 29/401, 29/157.1, 287/90 C
[51] Int. Cl.................................................B21d 53/10
[58] Field of Search ...............29/401, 149.5 B, 157.1, 148.4; 287/90 R, 90 C, 87

[56] References Cited

UNITED STATES PATENTS

| | | | |
|---|---|---|---|
| 3,202,749 | 8/1965 | White | 287/90 R |
| 3,218,383 | 11/1965 | White | 287/90 R |
| 3,238,602 | 3/1966 | White | 29/149.5 B |
| 3,266,134 | 8/1966 | Moskovitz | 29/401 |
| 3,381,987 | 5/1968 | Husen | 287/90 R |
| 3,400,440 | 9/1968 | Carlson | 29/157.1 |

Primary Examiner—John F. Campbell
Assistant Examiner—Donald P. Rooney
Attorney—Kinney, Alexander, Sell, Steldt & Delahunt

[57] ABSTRACT

A process for the repair of worn ball and socket joints, journal bearings, and the like, in which the bearing parts are prepositioned in operative relationship and, in the case of ball joints, at an extreme of the range of movement in the direction of separation of the parts, lubricating the joint if dry, and then injecting through the greasing orifice, or through an opening at the end of the bearing, a bearing composition comprising a hardenable resin in fluid form, the viscosity of which is at least slightly greater than that of bearing grease, and which on hardening has an impact hardness of the order of not less than about 500 p.s.i.

8 Claims, 1 Drawing Figure

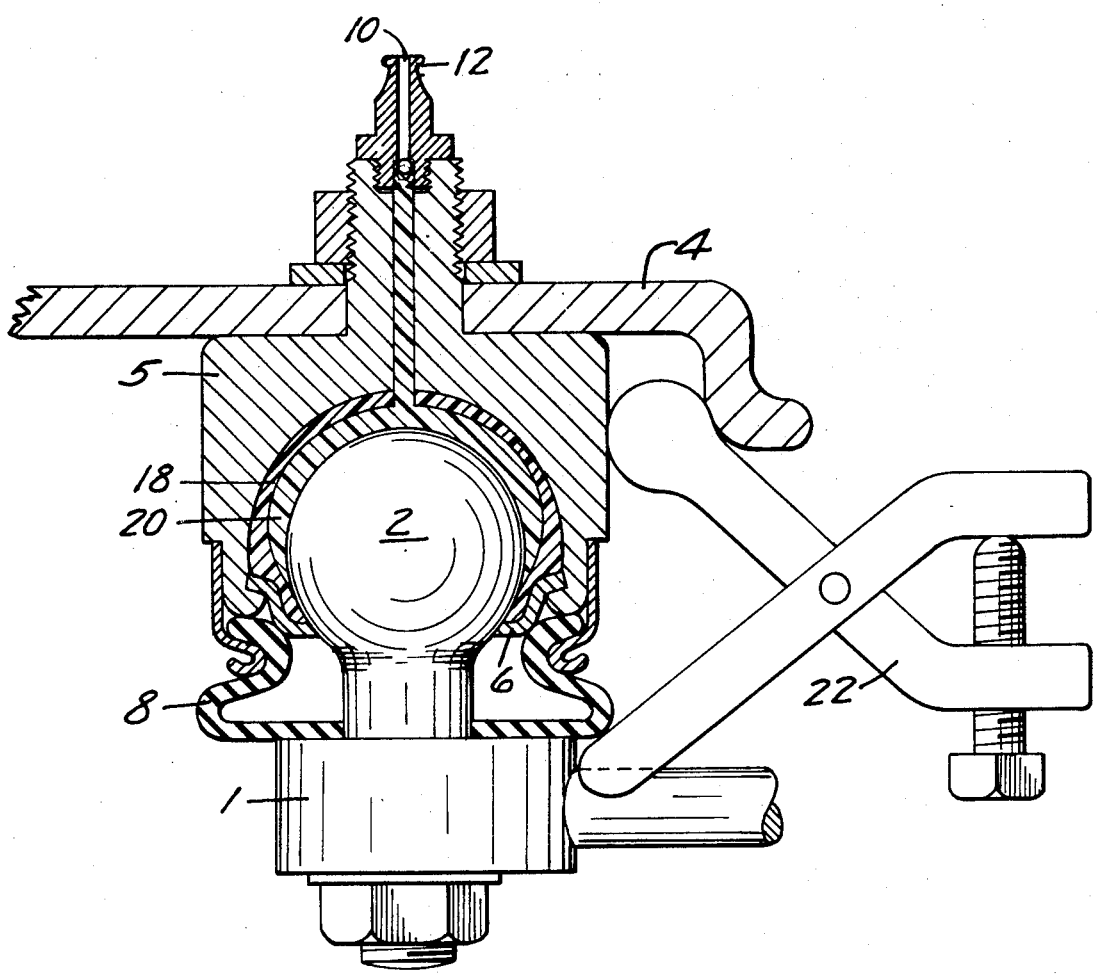

BEARING REPAIR

This is a continuation-in-part of my earlier filed applications, Ser. No. 678,431, filed Oct. 26, 1967, now abandoned and Ser. No. 848,672, filed Aug. 8, 1969.

BACKGROUND OF THE INVENTION

1. Field of the Invention

The invention relates to means for repairing ball and socket type automotive bearings, ball and socket type industrial bearings, and journal bearings which have become worn through use, without necessarily disassembling them or removing them from the vehicle or machinery to which they are attached.

2. Description of the Prior Art

It is known that bearings can be formed by pouring or injecting bearing material in liquid form into place between a shaft and bearing housing. For this purpose, low-melting metals, e.g. Babbit metals or plastic, synthetic resinous compositions or even polymers themselves have been used, e.g. as shown in U.S. Pat. Nos. 2,917,334; 2,919,150; 2,954,992; 3,091,486 and 2,970,869. So far as is known, however, it has not heretofore been found practically feasible to provide repairs for bearings and joints of this kind while in place on the machinery to which they are attached. Such joints, when worn, have heretofore been discarded and replaced with new parts.

SUMMARY OF THE INVENTION

The invention provides a process for repair of worn balljoint bearings and journal bearings, i.e., those in which a shaft revolves or turns in a bushing, which can be accomplished if desired without removing the bearings from the vehicle or the machinery to which they are attached. In accordance therewith, a process has been discovered which comprises the steps of (in the case of ball and socket type bearings) lubricating the worn bearings with grease, if not already lubricated; positioning the bearing parts while in operative relationship in such a way as to maximize the volume between the worn parts, and to effect at least partial seal between the ball and socket or the retainer portion of the bearing housing at the point of contact between the open end of the housing and the ball; injecting a hardenable, plastic bearing composition into the space between the parts of the bearing, at the same time forcing out the grease and loose pieces of worn bearing material; initiating hardening of the bearing composition; and maintaining the position of the parts of the bearing while the composition hardens. In the case of journal type bearings, the inner, or rotary, portion of the assembly is prepositioned in the center of the outer, or housing, portion of the bearing before injecting the bearing composition into the volume between the inner and outer portion of the bearing to form a bushing. The inner, or rotary, portion of the journal type bearing assembly should also be greased before injecting the bearing composition therein. It is desirable to cover one or both ends of the journal type bearing, in necessary, before injecting the bearing composition so that the bearing composition will be contained in the volume between the inner and outer portions of the bearing. Hardening of the bearing composition may be initiated in the same manner as when repairing ball and socket type bearings.

In addition to the process, the invention contemplates and is embodied in a hardenable fluid or fluidizable plastic bearing composition which is capable of being injected through a grease fitting into the bearing space between moving parts, the essential characteristics of which are that the material in the condition in which it is fluid and injected into the space between the bearing parts is not less viscous than the bearing grease, that gives values in the cone penetration test of the order of 200–500, and when hardened, is capable of withstanding static and dynamic loads of the order of not less than about 250–500 p.s.i. The material also is required to have the physical characteristics of useful bearing materials for ball joints such as those disclosed in U.S. Pat. No. 2,954,992.

Plastics which are suitable for use as bearing compositions include thermoplastic and thermosetting resins as well as suitably compression-resistant elastomers either alone or as a binder for varying amounts of metal powders, dry lubricants, reinforcing fibers and the like. For many purposes well-cured or high molecular weight polymers themselves provide adequate bearing surfaces. It has been observed that bearing compositions comprising mixtures of resins and elastomers are particularly suitable in practicing the invention.

Specific plastics which are useful in the compositions of the invention include polytetrafluoroethylene, poly(chlorotrifluoroethylene), polyamides, epoxy resins, pheno-formaldehyde resins, acetal resins, polycarbonate resins, polyurethanes, polysulfide rubbers, silicone elastomers, and the like.

The plastics of the invention may contain adjuvant materials. Additive materials can be metal powders or flakes such as powdered molybdenum, aluminum, copper, iron, bronze and the like. Solid lubricants can also be used, e.g. powdered graphite, powdered polytetrafluoroethylene, finely divided molybdenum disulfide, carbonized cellulose fibers, high melting waxes and the like. Liquid lubricants such as oils or thickened oils or greases can also be present in the composition. Useful reinforcing means of a fibrous nature include chopped nylon fibers, cotton fibers, glass fibers and the like. The latter tend to increase the compressive strength of the cured bearing composition, as do flaked metal powders.

In carrying out the process, the bearing composition selected may be in fluid state at ordinary temperatures, as where e.g. epoxy resins are employed, a separate curing or hardening agent being provided. The selected constituents (resin and curing agent) are mixed immediately before injection into the joint to be repaired, together with any additive which is desired, and the mixture is then injected into the joint before curing has advanced to a point of excessive viscosity increase. Thermoplastic materials, on the other hand, are heated until molten or at least fluid, then injected into the joint. Latent heat curing systems, such as latent epoxy resin systems, unsaturated polyester systems and the like may be employed as one-part systems. If only a small amount of thermoplastic material is to be injected, it may be necessary to preheat the metal parts of the joint before injection of thermoplastic compositions to prevent premature hardening of the bearing composition. When the injection of the fluid bearing composition takes place, excess grease, together with dirty, loose foreign objects, etc., is flushed out of the joint by the incoming composition.

It is not necessary to remove the old grease or worn remains of the original bearing material from the joint. Where the worn joint is practically greaseless (dry), it is lubricated before beginning the repair. Surprisingly, the presence of grease in the bearing cavity does not interfere with the repair, but instead, as noted, assists in obtaining a clean substrate for the subsequently introduced bearing composition. At the same time, the presence of grease on the ball or shaft itself tends to prevent tight adherence of the injected bearing composition to the ball or shaft and eliminates the necessity for breaking the material loose from this area before placing the joint back into service.

Where two-part systems are used, it is found to be advantageous and is a preferred embodiment of the invention, to incorporate the material into a cartridge, in which separate compartments contain a curing or hardening agent and e.g., an epoxy resin. Immediately prior to use, the two compartments are made to communicate with each other and the contents are thoroughly mixed. Thereafter, so much of the cartridge as is needed is conveniently injected by means of a "grease gun" type of tool in which a piston pushes the material to be injected through a nozzle and into the joint. Any unused material is easily removed from the tool and discarded, as it remains in the cartridge, without problems connected with the necessity for cleaning up the resinous composition prior to hardening.

The invention is further illustrated by means of the drawing. In the drawing, an elevation of one type of an automotive ball-type steering joint is shown in partial cross section.

Referring to the drawing, mounted upon a steering arm member 1 is a ball member 2, and mounted upon a control arm 4 is a socket member 5 to which is attached retainer 6. A grease seal 8 is provided. A passage 10 lends through a grease fitting 12 and socket 5 to the bearing space between the ball and the socket members. The original bearing material is shown at 18. As shown, the bearing space is expanded to its greatest volume by means of temporary tool 22, which positions the joint so that a retainer 6 contacts the ball at the lower portions thereof.

While a tool is shown for separating the parts of the bearing, this may not be necessary if the construction of the vehicle is such that merely lifting the body so as to take the weight off the wheels causes proper positioning of the bearing parts. Where the joints are spring-loaded, it also suffices merely to inject bearing repair composition until the spring tension is significantly increased.

In carrying out the process of the invention, the bearing space is filled through passageway 10 with a standard bearing grease if the worn joint is found to be ungreased. A plastic bearing composition in fluid form, and not less viscous than the said grease, but fluid enough to be forced through the said passageway, is then forced into the bearing space through passageway 10 to form the bearing repair 20 by means of a filling device (not shown) provided with a cylindrical barrel for the plastic bearing composition, a plunger in the barrel for forcing the plastic composition into the joint, and a suitable nozzle and threaded fitting on the nozzle for temporary attachment to the joint socket at the point where grease fitting 12 is attached. Grease fitting 12 is removed and the threaded nozzle of the filling device is screwed in. During injection of the plastic bearing composition, the grease is forced out of the joint, into the space between seal 8 and the ball. When the joint is filled, e.g. as shown by a marked increase in pressure, the tool is removed and the plastic bearing repair composition 20 is permitted to harden in place. The grease fitting can be replaced if desired, or a suitable plug inserted into the threaded connection. When the plastic composition has completely hardened, temporary tool 22 is removed or the vehicle is removed from the hoist or lift means if these were used.

To illustrate more specifically the process of the invention and the repair compositions employed therein, the following examples are set forth, in which all parts are by weight unless otherwise specified.

EXAMPLE 1

Seven automobiles having worn ball joints in the steering system were repaired using the above-described technique. These had a top and bottom joint on each side, but the stabilizer ball joint seldom wears. The load-bearing joint on each side was repaired in each case. On each car, the left-hand lower ball joint was repaired using a thermosetting resin and the right-hand lower ball joint was repaired using a thermoplastic composition. The bearing repair compositions were as follows:

Thermoset:
epoxy resin (condensation product of bisphenol-A and epichlorohydrin, epoxy equivalent weight = 175–180) 16 parts
curing agent (ZZLA 0372 — polyamine fast room temperature curing agent, Bakelite Union Carbide) 4 parts
graphite — 13.4 parts Thermoplastic:
polyamide resin (No. 113 Zytel, Nylon 6—6 molding resin) 100 percent The thermosetting composition was readily extrudable from the grease gun tool when mixed prior to cure. Before addition of the graphite, the mixture had Stokes viscosity at 25° C. of about 13–17, which was increased somewhat upon addition of the graphite. The cone penetration of the uncured graphite-containing resin was 324; the penetration had decreased to 292 at 47° C. after 12 minutes cure time. The mixture had gel time of about 15 minutes. The thermoplastic resin, upon melting at about 310°-340° C., was fluid and of relatively low viscosity, approximately that of bearing grease.

Both compositions were readily injected into the worn joints, which in all cases contained the residue of grease remaining from previous lubrications. Upon injection of the repair composition, loose fragments of worn bearing material as well as the old grease were flushed out of the joint; however, any material which remained apparently became solidly embedded in the bearing repair composition. In each case, the vehicle was raised on a lift to remove weight from the wheels. In the cases where spring-loaded ball joints were present, the repair composition was forced into the joint to increase the tension on the spring. After hardening of the bearing repair compositions, the vehicles were tested by driving them under actual driving conditions for a distance of approximately 20,000 miles. The repaired joints were then examined as to their condition.

The results obtained were as follows.

TABLE I

| Test Car No. | Joint Position | Joint Play (inches) Before Repair | After Test Mileage | Test Mileage |
| --- | --- | --- | --- | --- |
| 1 | left | .054 | .029 | 22,400 |
| 1 | right | .044 | .024 | 22,400 |
| 2 | left | .040 | .005 | 20,500 |
| 2 | right | .044 | .002 | 20,500 |
| 3 | left | .087 | .006 | 20,540 |
| 3 | right | .016 | 1 | 20,540 |
| 4⁴ | left | .014 | .002 | 20,550 |
| 4 | right | .045 | .056 | 20,550 |
| 5⁴ | left | .051 | .064 | 20,000 |
| 5 | right | .046 | .013 | 20,000 |
| 6 | left | 2 | 2 | 20,448 |
| 6 | right | 2 | 2 | 20,448 |
| 7 | left | 2 | 2 | 20,269 |
| 7 | right | 2 | 2 | 20,269 |
| 8³,⁴ | left | .013 | .014 | 20,540 |
| 8 | right | .048 | .008 | 20,540 |
| 9³,⁴ | left | .016 | .011 | 20,165 |
| 9 | right | .073 | .061 | 20,165 |
| 10³,⁴ | left | .032 | .017 | 30,590 |
| 10 | right | .048 | .023 | 30,590 |
| 11³,⁴ | left | .081 | .060 | 30,543 |
| 11 | right | .040 | .040 | 30,543 |

¹ Damage upon removal for inspection.

² These joints were spring loaded, thus having no play before or after wear. Before repair, the joints were obviously heavily worn as shown by the position of the ball in the socket. After repair, the joint springs were under increased tension and the position of the ball indicated that the joints were restored to approximately normal position.

³ Thermoset resin used for repair in both joints.

⁴ Positioning of the joint parts was not as accurate as in test cars 1–3.

In all cases, the repaired joints functioned properly at all speeds and under all road conditions. The tests showed that the repaired joints were satisfactory for at least 20,000 miles.

EXAMPLE 2

Two journal-type bearings for a roll for a film calender were repaired in accordance with the technique described herein. The bearings were approximately 14 inches in diameter and were approximately ⅝ inches long. The joint play before repair was approximately one-half inch. The bearings were repaired using the thermosetting resin of Example 1. Example 1 gives a complete description of the properties of this resin.

The inner, or rotary, portion (shaft) was greased initially. The roll shaft was then positioned so as to be, as nearly as possible, in the center of the housing, or outer, portion of the bearing and in engagement with the other roll, in operative position. A circular steel ring was then placed over each end of the bearing housing to act as dams to hold the bearing repair resin which was to be later injected therein. Steel nipples were then welded to one of the steel rings so that the repair resin could be injected into the space between the shaft and the housing of the bearing. The repair resin was injected into the above-described space in a manner similar to that used in Example 1. The resin was allowed to cure overnight after which the bearing was ready for immediate use. The bearing resin, alternatively, might have been heat-cured in a much shorter period of time. An important feature in this case is that the bearing did not have to be disassembled in order to be repaired, which accordingly eliminated a considerable amount of costly "downtime."

After six months of extensive use, the bearing was functioning as well as similar bearings using the conventional bronze sleeves.

EXAMPLE 3

Four ball and socket joints on two road grader blade arms were repaired using the thermosetting resin of Example 1.

EXAMPLE 4

Various bearing repair compositions were prepared using epoxy resins with various curing agents. Some of the compositions were tested for their properties prior to curing, to compare them to bearing grease; after curing, the materials were tested to determine their hardness, percent compression on load and percent permanent deformation after test. ASTM test for cone penetration of lubricating grease, designation D 217–65 T, was used to determine the relative viscosity of the compositions as related to lubricating greases. In this test "Ace" (Lithium D) grease gives 266–269 and "Trophy Amber Grease" 287.

ASTM specification D 695–63 T, "Compressive Properties of Rigid Plastics," was used to determine compression values except that the test specimen was changed to be a flat disc approximately 100 mils thick and 0.6 inch in diameter, to be more closely similar to the configuration of the bearing composition in the intended application. The load rate was 0.02 inch per minute, and the specimens were loaded to a maximum stress of 5,000 p.s.i. The readout of the machine was a load v. cross head travel curve.

The repair compositions and ingredients are shown in Table II. The compositions having lower permanent deformation after test have the better wear properties.

TABLE II

| Composition No. | Epoxy, parts | Curing agent, parts | Metal powder, parts | Lubricant, parts | Compression on test, percent | Permanent deformation after test, percent | Cone penetration, viscosity |
| --- | --- | --- | --- | --- | --- | --- | --- |
| A | a 12 | b 8 | Cu, 60 | MoS₂, 20 | 13.0 | 0.10 | |
| B | a 12 | b 8 | Mo, 50 | MoS₂, 30 | 7.8 | 0.16 | 269–275 |
| C | a 9.4 | b 14.2 | Al, 53.2 | MoS₂, 23.2 | 12.3 | 0.10 | |
| D | a 10.9 | b 7.3 | Fe, 61.4 | MoS₂, 20.4 | 10.8 | 0.33 | |
| E | a 17.4 | c 2.6 | | | 8.6 | 0.10 | |
| F | a 17.8 | d 2.2 | | | 4.8 | 0.0 | |
| G | a 16.7 | e 3.4 | | | | | |
| H | a 12.0 | f 8.9 | | | | | |
| I | a 10.9 | b 7.3 | | | 8.4 | 3.6 | |
| J | a 16.0 | g 4.0 | | | 8.5 | 4.11 | 324–392 |
| K | a 16.0 | g 4.0 | | Graphite, 13.4 | 8.6 | | |
| L | a 16.0 | g 4.0 | | MoS₂, 46.7 | 5.9 | | |
| M | a 16.0 | g 4.0 | | MoS₂, 10; graphite, 10 | | | |
| N | a 16.0 | g 3.0, h 4.0 | | Graphite, 15.3 | 8.4 | | |
| O | a 16.0 | g 3.0, h 4.0 | | MoS₂, 53.7 | 8.5 | | |
| P | a 16.0 | g 3.0, h 4.0 | | MoS₂, 11.5; graphite, 11.5 | | | |
| Q | (1) | 113—100 | | | 1.0 | 0 | |
| R | (2) | —100 | | | 1.78 | 0 | |
| S | (3) | —100 | | | 3.35 | 0 | |

1 Nylon molding resin, Zytel.
2 Acetal resin, Delrin.
3 Polycarbonate resin, Merlon.
a Epoxy resin, condensation product of bisphenol-A and epichlorohydrin, epoxy equivalent weight 175–180.
b Versamide 125, linear polyamide curing agent derived from condensation of dimeric fatty acid and polyamines.
c Epicure 874, aliphatic curing agent, equivalent weight ca. 40, for high speed cure of epoxy resins.
d ZZLA 0054 polyamine curing agent, equivalent weight ca. 25.
e Epicure 87, extremely reactive modified aliphatic amine curing agent, equivalent weight ca. 38.
f Epicure 858, polymeric amido-amine curing agent, equivalent weight ca. 116.
g ZZLA 0372, polyamine fast room temperature curing agent, equivalent weight ca. 45.
h Epicure 861, accelerated polymercaptan curing agent, equivalent weight ca. 63.

Normally these joints have shims which prevent play in the joints. However, when the shims are worn out, the entire ball and socket assembly must be replaced.

The ball joint linkages of this example had worn through all of the shim stock prior to the time of prior. The linkages were disassembled and new shims were mounted as is normally done. The thermosetting resin of Example 1 was then injected into the space between the shims and the bearing housing in accordance with the method of Example 1. The advantage of the repaired bearing lay in the fact that no new shims were required when the old shims wore through. Instead, the resin composition served as the surface upon which the ball turned. After extensive use, the ball joint linkages were still functioning as well as similar linkages employing the normal shim stock.

EXAMPLE 5

An automobile having new compression type ball joints installed in the load bearing position was subjected to 50,000 miles of driving under normal road conditions. One of the ball joints was maintained (i.e., greased regularly) as per manufacturer's recommended maintenance instructions. The other joint was initially filled according to the procedure described above with a plastic bearing repair composition having the following components:

| | Parts |
| --- | --- |
| A. Epoxy resin, novolac-type, having more than two epoxy groups per molecule (Epi-Rez 5109) | 16.75 |
| B. A composition consisting of: 90 g. mercapto-terminated butadiene: acrylonitrile polymer 30.0 polysulfide hardener (Epicure 861 M) | |

15.0 g. graphite (99&<325 mesh)
1.87 g. MoS$_2$
1.87 g. powdered polytetrafluoroethylene 5.3

Physical data on the bearing repair composition:

Four hours after injection:
| | |
|---|---|
| Shore D hardness | 8 |
| Shore A hardness | 92 |

Seven hours after injection:
| | |
|---|---|
| Shore D hardness | 15 |

Twenty-four hours after injection:
| | |
|---|---|
| Shore D hardness | 15 |

After composition fully hardened:
| | |
|---|---|
| Tensile strength | 550 p.s.i. with 100% elongation |
| Modulus of elasticity | 550 p.s.i. |

The injected joint was not greased during the test. The results of the experiment showed that the injected joint exhibited no play between the ball and the socket of the joint indicating that no wear had occurred after 50,000 miles, while the noninjected but regularly maintained joint showed play of 0.01 to 0.015 inch, indicating a proportionate amount of wear.

EXAMPLE 6

A 1968 Ford automobile having spring-loaded ball joints was subjected to 50,000 miles of driving under normal road conditions. One of the joints was initially greased and then injected according to the procedure described above with a plastic bearing repair composition having the following components:

| | |
|---|---|
| A. Epoxy resin, novolac-type, having more than two epoxy groups per molecule (Epi-Rez 5109) | 12 g. |
| B. Mercapto-terminated butadiene acrylonitrile polymer | 24 g. |
| Polysulfide hardener (Epicure 861 M) | 7.9 g. |
| Graphite (99% <325 mesh) | 4.31 g. |
| C. Lithium grease | 18 g. |

Parts B and C were mixed together prior to inclusion of Part A.

The results of the experiment demonstrated the joint to be functioning totally satisfactory after termination of the road test.

EXAMPLE 7

The procedure of Example 6 was repeated with the exception that the plastic bearing repair composition had the following components:

| | Parts |
|---|---|
| A. Consisting of: | |
| 62.3 parts toluene di isocyanate | |
| 31.4 parts polypropylene glycol (mw: approx. 400, approx. hydroxyl number: 265) | |
| 6.3 parts polyoxypropylene derivative of trimethylol propane (mw: approx. 410, approx. hydroxyl number: 410) | 30 |
| B. Consisting of: | |
| 88.9 parts polypropylene glycol (mw: approx. 2000, approx. hydroxyl number: 561) | |
| 0.37 parts litharge paste | |
| 4.7 parts Cab-O-sil | |
| 5.4 parts methylene bis-ortho chloroaniline | |
| 0.34 parts 2 ethyl-hexoic acid salt of calcium (calcium Hexogen) | |
| 0.59 parts phenyl mercuric acetate | |
| 0.4 parts Ionol | 100 |
| C. Graphite (99%<325 mesh) | 56 |

Parts B and C were mixed together prior to inclusion of Part A.

The results of the experiment demonstrated the joint to be functioning totally satisfactory after termination of the road test.

I claim:

1. A process for repair of worn, previously lubricated ball-joints for journal type bearings without removal of worn bearing material therefrom, which comprises the steps of:
   1. positioning the parts of the bearing assembly so as to place the ball or shaft portion of the bearing and the outer retainer portion of the bearing in operative position;
   2. injecting into the space between the said ball or shaft portion of the bearing and the outer retainer portion of the bearing a plastic hardenable bearing composition having initial viscosity not less than about that of bearing grease; and display impact strength sufficient to withstand significant permanent deformation under conditions of use after hardening;
   3. continuing injection of the said bearing composition until grease and loose bearing fragments have been displaced from the bearing and the space between the parts thereof has been substantially filled; and
   4. causing the said bearing composition to harden wherein said hardened bearing composition forms the surface against which the ball or shaft portion of the bearing wears.

2. A process according to claim 1, in which the bearing is a journal type bearing, and in which the shaft is centered inside the outer retainer portion of the bearing before the injection of the bearing composition.

3. A process for repair of worn, previously lubricated ball-joint bearings without removal of worn bearing material therefrom, which comprises the steps of:
   1. positioning the parts of the bearing housing so as to bring the open end of the ball-joint housing or seal into contact with the ball while in operative position so as to maximize the volume between the worn parts;
   2. injecting into the space between the ball and the housing a plastic, hardenable bearing composition having initial viscosity not less than about that of bearing grease; and displaying impact strength sufficient to withstand significant permanent deformation under conditions of use after hardening;
   3. continuing injection of the said bearing composition until grease and loose bearing fragments have been displaced from the bearing and the space between the parts thereof has been substantially filled; and
   4. causing the said bearing composition to harden wherein said hardened bearing composition forms the surface against which the ball portion of the bearing wears.

4. A process according to claim 3, in which the bearing is lubricated with bearing grease prior to injection of plastic bearing material.

5. A process according to claim 3, in which spring loading of said joint is increased by injection of said bearing composition.

6. A process for removing play and extending the useful life of ball-joint or journal type bearings without removal of original bearing material therefrom, which comprises the steps of:
   1. positioning the parts of the bearing assembly so as to place the ball or shaft portion of the bearing and the outer retainer portion of the bearing in operative position;
   2. injecting into the space between the said ball or shaft portion of the bearing and the outer retainer portion of the bearing a plastic, hardenable bearing composition having initial viscosity not less than about that of bearing grease; and displaying impact strength significant to withstand significant permanent deformation under conditions of use after hardening;
   3. continuing injection of the said bearing composition until grease has been displaced from the bearing and the space between the parts thereof has been substantially filled; and
   4. causing the said bearing composition to harden wherein said hardened bearing composition forms the surface against which the ball or shaft portion of the bearing wears.

7. A process according to claim 6, in which the bearing is a journal type bearing, and in which the shaft is centered inside the outer retainer portion of the bearing before the injection of the bearing composition.

8. A process for removing play and extending the useful life of a ball-joint journal type bearing without removal of original bearing material therefrom, which comprises the steps of:
1. positioning the parts of the bearing housing so as to bring the open end of the ball-joint housing or seal into contact with the ball while in operative position so as to maximize the volume between the parts;
2. injecting into the space between the ball and the housing a plastic, hardenable bearing composition having initial viscosity of not less than about that of bearing grease; and displaying impact strength sufficient to withstand significant permanent deformation under conditions of use after hardening;
3. continuing injection of the said bearing composition until grease has been displaced from the bearing and the space between the parts thereof has been substantially filled; and
4. causing the said bearing composition to harden wherein said hardened bearing composition forms the surface against which the ball portion of the bearing wears.

* * * * *

UNITED STATES PATENT OFFICE
CERTIFICATE OF CORRECTION

Patent No. 3,650,004     Dated March 21, 1972

Inventor(s) Theodore R. Bergstrom

It is certified that error appears in the above-identified patent and that said Letters Patent are hereby corrected as shown below:

Column 4, line 36, in Table I the numeral "2" should be changed to read "$2^3$".

Column 4, lines 42-45, in the column headed "After Test Mileage", the numeral "2" should be superscript 2 in each occurrence.

Column 4, line 72, "-5/8" should be changed to read "fourteen".

Column 5, line 65, the second "prior" should be changed to the word "repair".

Column 8, line 26, insert the word "type" after the word "joint".

Signed and sealed this 3rd day of October 1972.

(SEAL)
Attest:

EDWARD M. FLETCHER, JR.
Attesting Officer

ROBERT GOTTSCHALK
Commissioner of Patents